United States Patent [19]

Johann et al.

[11] 4,268,905
[45] May 19, 1981

[54] AUTONOMOUS FAULT DIAGNOSIS FOR DISK DRIVE USING AN INTERNAL MICROPROCESSOR

[75] Inventors: Donald F. Johann, Palo Alto; Charles E. Mendenhall, Campbell, both of Calif.

[73] Assignee: Sperry Rand Corporation, New York, N.Y.

[21] Appl. No.: 969,604

[22] Filed: Dec. 14, 1978

[51] Int. Cl.³ .................. G06F 11/00; G06F 13/04
[52] U.S. Cl. .................................. 364/200; 360/31; 371/21
[58] Field of Search ... 364/200 MS File, 900 MS File, 364/300; 235/312, 302.3, 304; 360/97–99, 31; 371/15, 23–25

[56] References Cited

U.S. PATENT DOCUMENTS

| | | | |
|---|---|---|---|
| 3,953,889 | 4/1976 | Scieszinski et al. | 360/98 |
| 4,044,244 | 8/1977 | Foreman et al. | 235/304 |
| 4,053,751 | 10/1977 | Ault | 235/302.3 |
| 4,096,579 | 6/1978 | Black et al. | 364/900 |
| 4,101,969 | 7/1978 | Lawson et al. | 364/900 |
| 4,103,338 | 7/1978 | Cizmic et al. | 364/900 |

*Primary Examiner*—Mark E. Nusbaum
*Attorney, Agent, or Firm*—Kenneth R. Allen; Eugene T. Battjer; William E. Cleaver

[57] ABSTRACT

A disk drive control system incorporating an internal microprocessor and internal testing capabilities. The disk drive control system is capable of simulating drive operation without carriage motion so as to test substantially all functional subsystems of the disk drive. The test technique comprises the exercising of subsystems and a diagnosis of operations according to a hierarchy of interdependence of subsystem operation.

10 Claims, 8 Drawing Figures

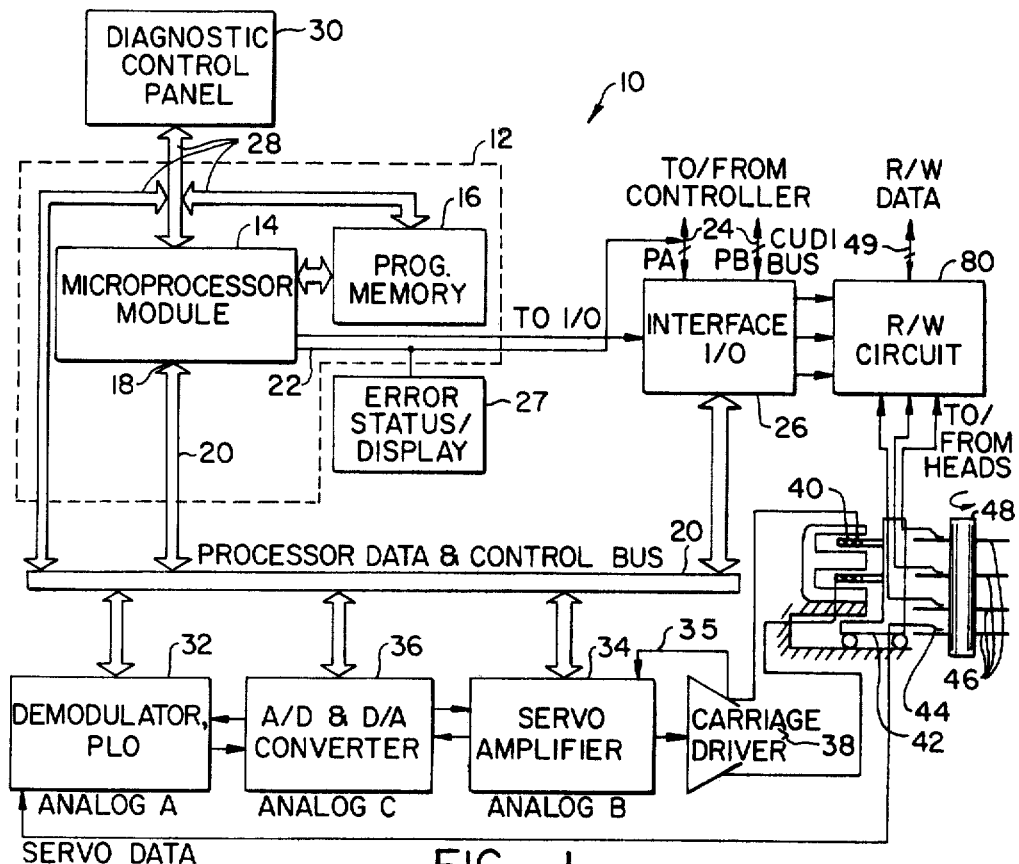
FIG._1.
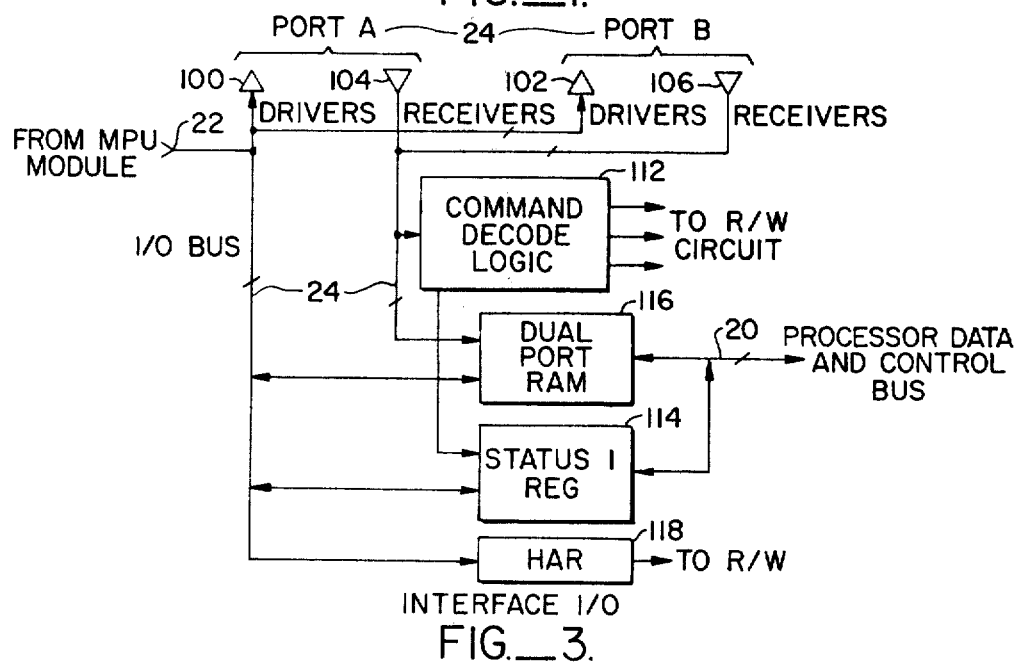
FIG._3.

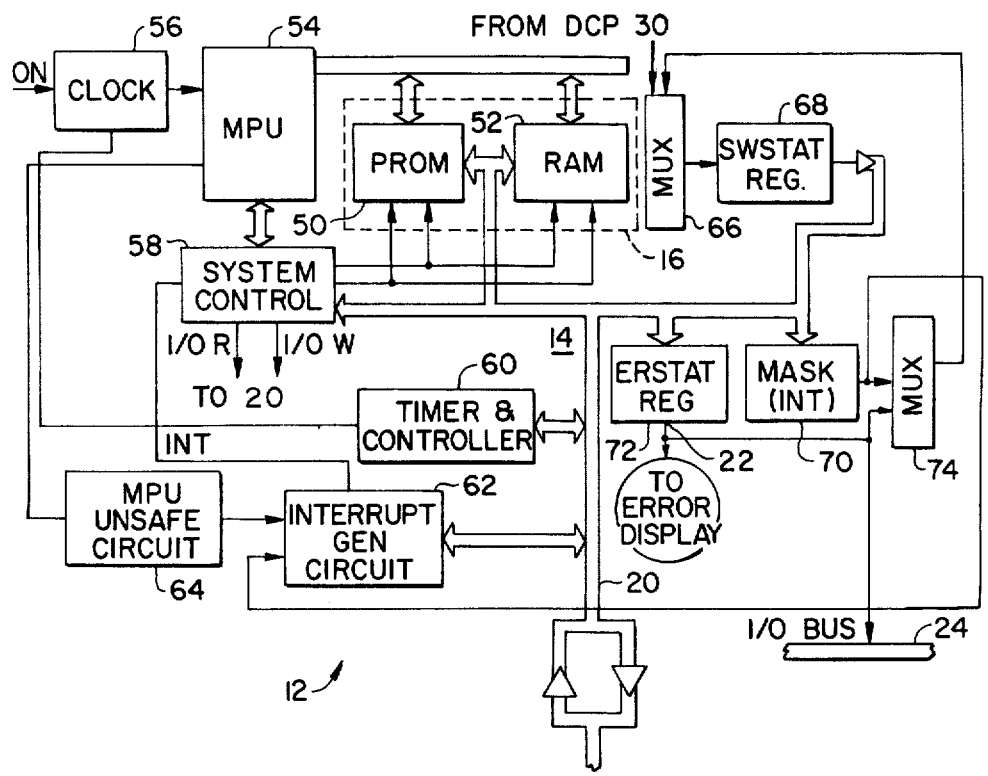
FIG._2.
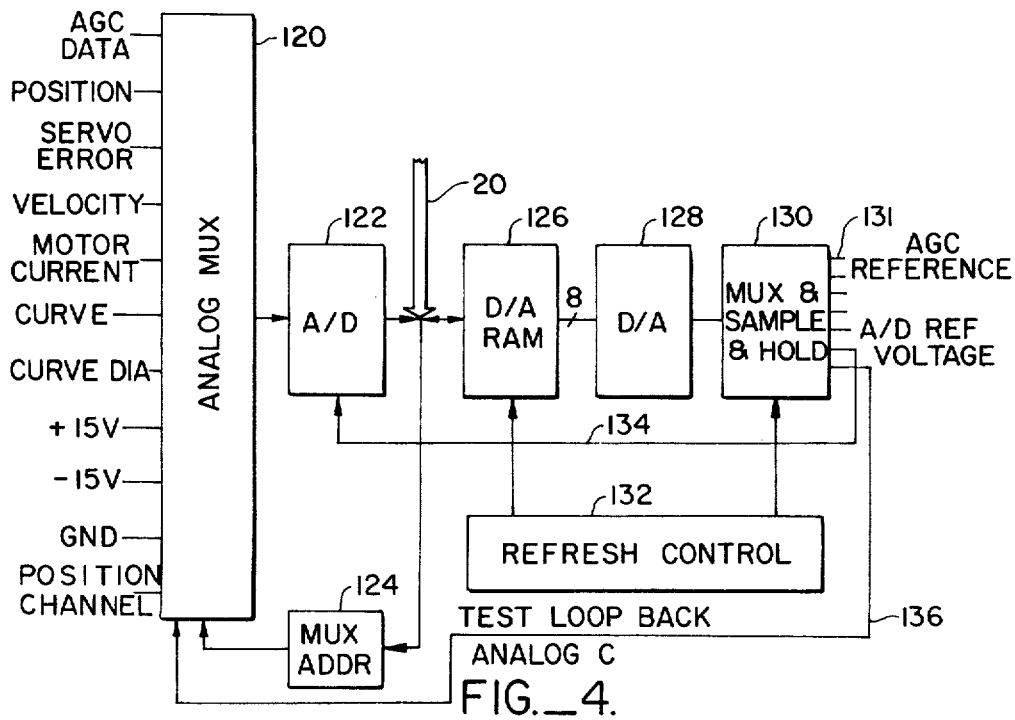
FIG._4.

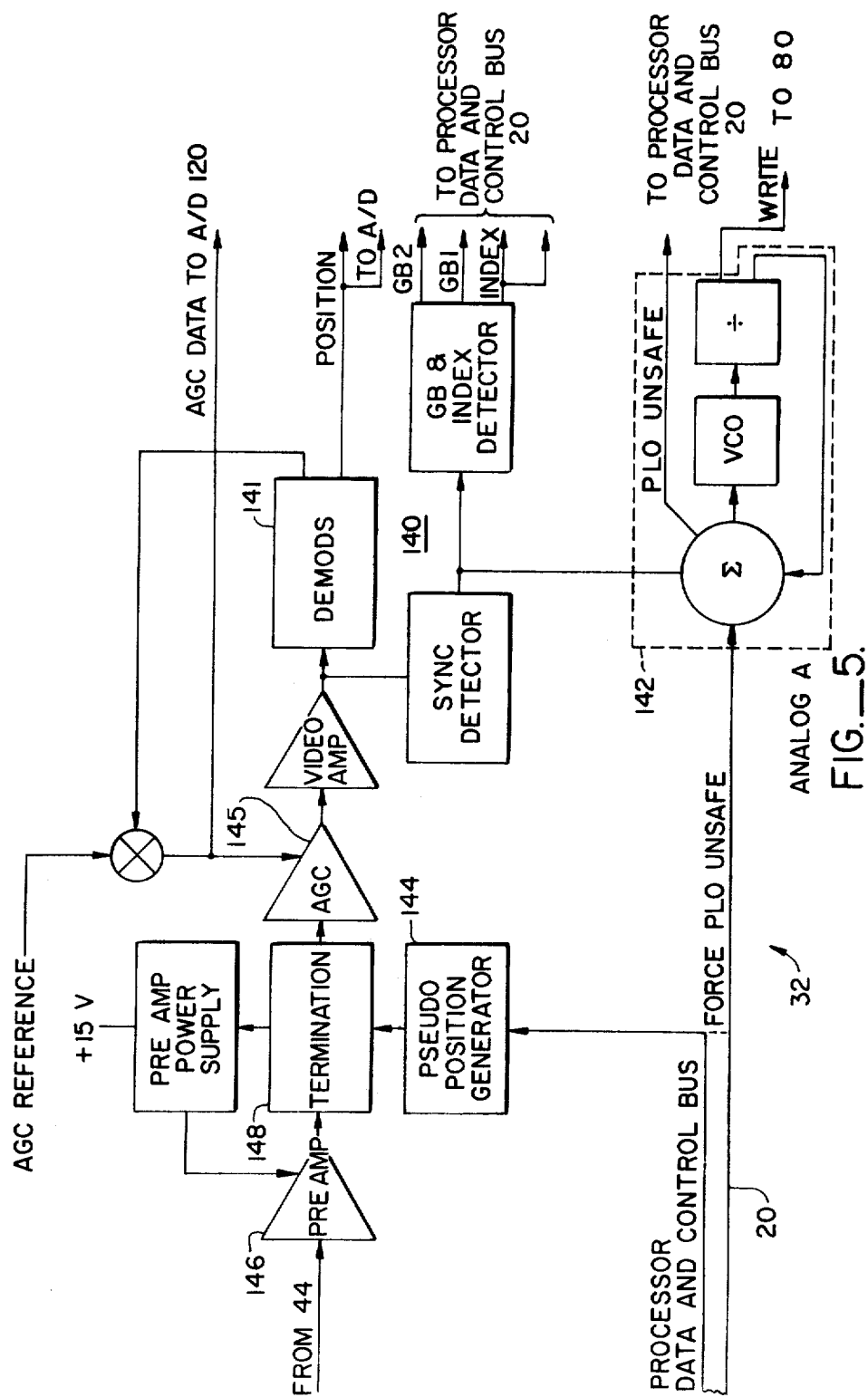
FIG._5.

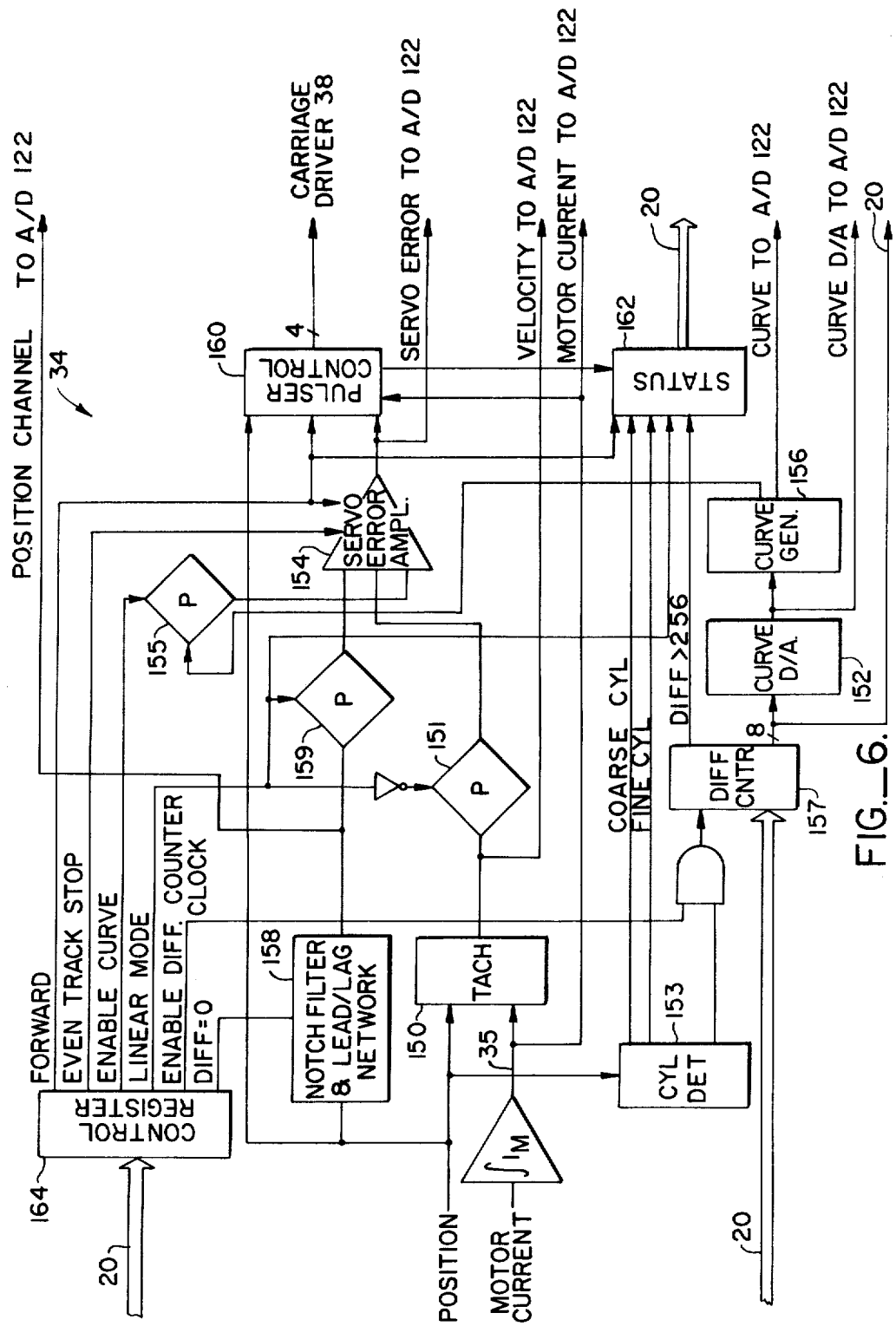

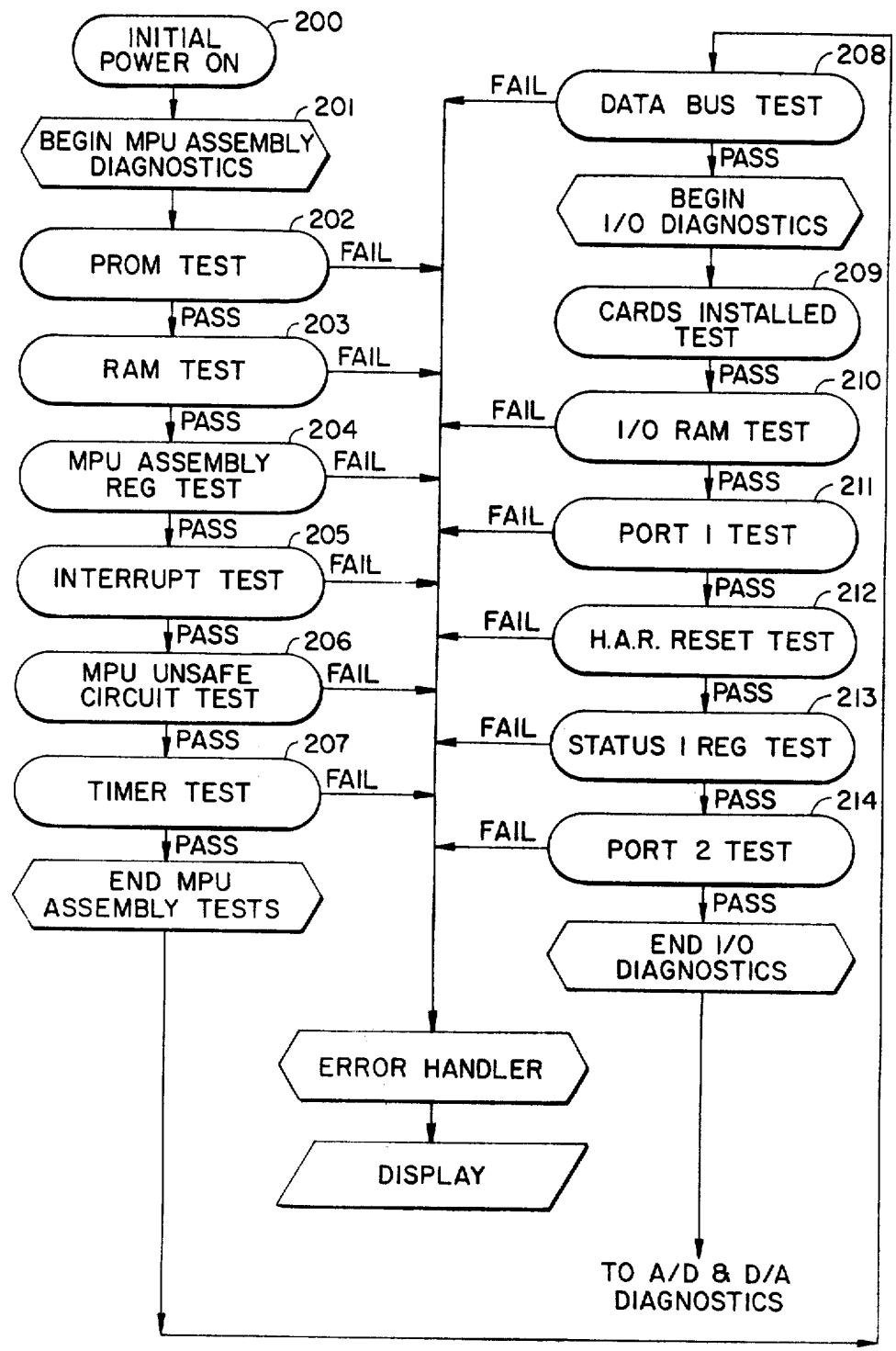
FIG._7A.

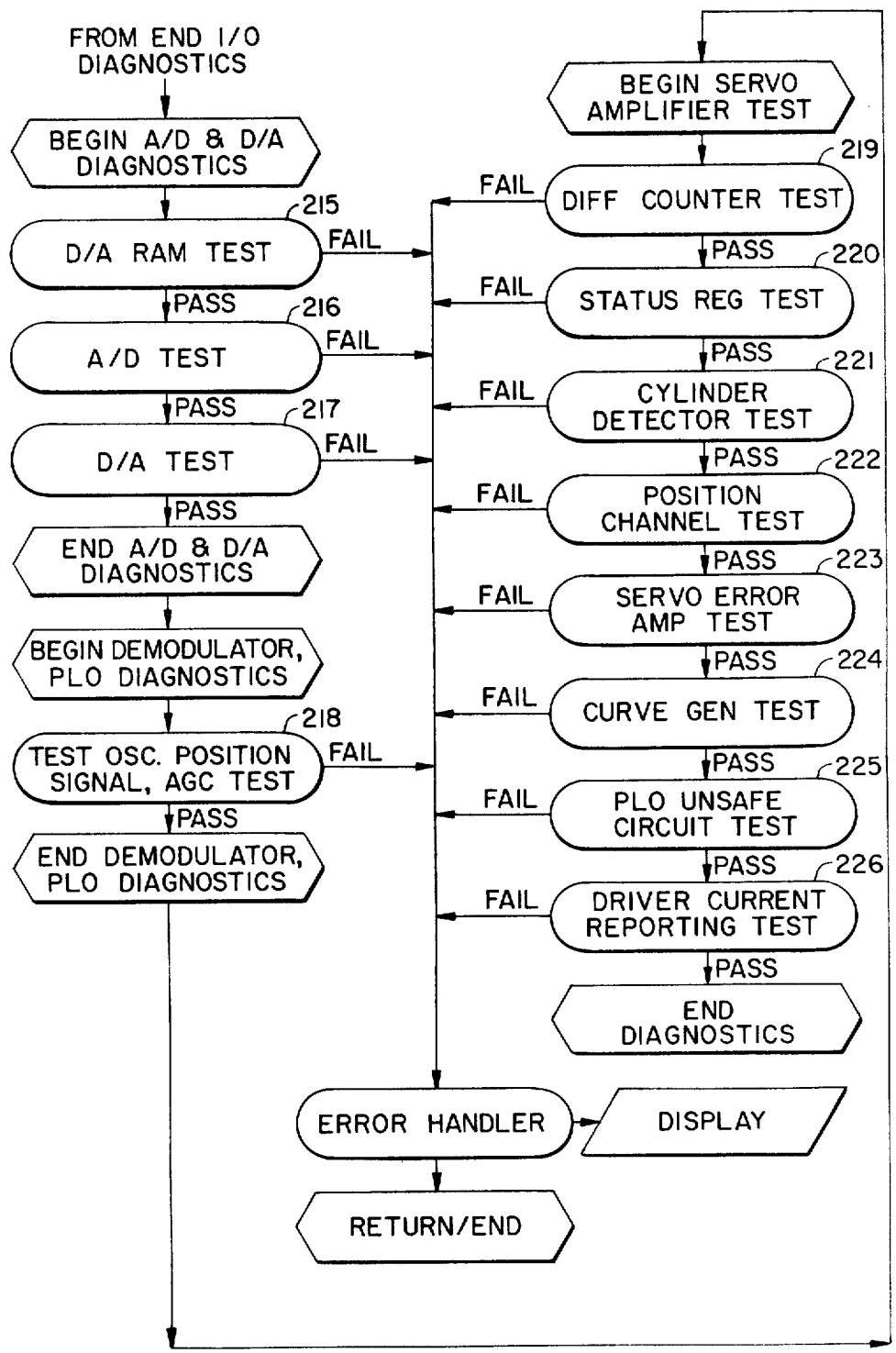
FIG._7B.

AUTONOMOUS FAULT DIAGNOSIS FOR DISK DRIVE USING AN INTERNAL MICROPROCESSOR

BACKGROUND OF THE INVENTION

This invention relates to disk drive systems equipped with a programmed microprocessing assembly or like autonomous control device capable of responding to stimuli external of the disk drive and to conditions within the disk drive in order to perform independent rational functions. In particular, the invention relates to self-testing of disk drive systems.

It is a general practice to test disk drives through external stimulus, as through a central controller of a host computer system under operating conditions which include carriage motion. Recently autonomous controllers within disk drives have been developed. Such disk drives have control and decision making capability sufficient to carry out preselected rational functions either interactively with the host control device or independently of the control device. For example the ISS/Sperry Univac Models 7350 and 8450 Disk Drives, manufactured by ISS/Sperry Univac of Cupertino, Calif. now incorporate microprocessor assemblies which have been preprogrammed to perform most of the traditional functions of random logic within disk drives.

Heretofore extensive fault diagnosis of disk drive internal workings has not been known, although some fault diagnosis has been carried out through host controller systems. The fault diagnosis of host controller systems has typically involved exercising the disk drive system components under operating conditions, as for example by moving the carriage which supports the read and write heads confronting the rotatable magnetic disks. A malfunction is detected by the failure of the disk drive to correctly transfer address or data information signals to the host controller via an interface input-/output (I/O) bus or to a resident memory associated with a host central processing unit via a read/write (R/W) data bus. When a malfunction or fault is finally detected as a failure, there may have already occurred internal damage to the disk drive or loss of data. A typical failure is for example a "head crash" caused by malfunction in the carriage servo circuitry causing data to be lost or the magnetic surface of the disk to be damaged. Heretofore it has not been known to detect failure in servo circuitry unless the carriage is moved.

SUMMARY OF THE INVENTION

According to the invention, a disk drive control system is disclosed which incorporates an autonomous preprogrammed microprocessing assembly and internal circuitry which is capable of simulating disk drive operation without carriage motion so as to test the internal subsystems of the disk drive. As used herein "autonomous" means capable of operation with independent decision making capabilities. The architecture of the disk drive incorporates loopback diagnostic capabilities, special purpose circuitry such as a pseudo-position generator for creating a signal simulating a servo position signal, and means for coupling critical nodes of the subsystem circuitry to a common data and control bus associated with the microprocessor assembly. The system diagnostics are performed according to a hierarchy of interdependence of subsystem interconnection and operation in order to eliminate ambiguity in identifying faults. The faults are isolated to relatively small block subsystems.

OBJECTS AND ADVANTAGES OF THE INVENTION

An object of this invention is to provide a disk drive with means capable of independent self-diagnosis of internal faults, particularly before the commencement of normal operation.

Another object of the invention is to provide for a disk drive means capable of detecting incipient malfunctions. In particular, it is an object to provide a disk drive with a capability of isolating malfunctions to relatively small functional blocks which would not otherwise be accessible to a host system.

A related object is to provide a capability of fault isolation within the printed wiring assemblies or circuit boards of a disk drive system, and not merely identification of faults which are only initially apparent at an interface input/output port. This greatly reduces service and repair time, thereby representing a savings in valuable computer operation time and reduced repair costs.

A further object of the invention is to provide a technique for internal testing of a disk drive system without movement of the carriage and further to prevent carriage movement in the event of a failure. A major cause of preventable damage and loss of disk-stored data has been undesired carriage movement under conditions of servo system malfunction. The invention herein described enhances the level of data protection because the likelihood of a servo system malfunction, or head crash, due to carriage movement is minimized.

These and other objects and advantages of the invention will be apparent upon reference to the following detailed description taken in conjunction with the accompanying drawings.

BRIEF DESCRIPTION OF THE DRAWINGS

FIG. 1 is a block diagram of a disk drive according to the invention.

FIG. 2 is a block diagram of a microprocessor assembly of FIG. 1.

FIG. 3 is a block diagram of an interface input/output system of FIG. 1.

FIG. 4 is a block diagram of selected subsystems of FIG. 1.

FIG. 5 is a block diagram of further subsystems of FIG. 1.

FIG. 6 is a block diagram of still further subsystems of FIG. 1.

FIGS. 7A and 7B constitute a flow diagram of operation of a diagnostic controller in the system of FIG. 1.

DETAILED DESCRIPTION OF PREFERRED EMBODIMENTS

In order to understand the environment and operation of the invention, it is necessary to examine the architecture of a disk drive system incorporating a microprocessing assembly and a diagnostic controller. FIG. 1 illustrates a disk drive system 10 in block diagram form which incorporates self-diagnosis features according to the invention. The disk drive system 10 is built around a microprocessor assembly 12 which replaces many of the random logic functions of prior art drive systems.

The microprocessor assembly 12 comprises a microprocessor module 14, a program and working storage memory 16, a processor bus terminal 18 coupled to a processor data and control bus 20, an input/output (I/O) bus coupling 22 connected to a host system interface input/output bus, called the control unit/drive interface (CUDI) bus 24, and an interface input/output (I/O) circuit 26 as hereinafter explained, the CUDI bus 24 being coupled to a host controller (not shown), an error status/display means 27 connected to the coupling 22 and a switch panel bus 28 which is coupled between the microprocessor module 14, an external diagnostic control panel 30, the memory 16 and the processor bus 20. The diagnostic control panel 30 is a switch panel for manually conveying digital signals to the microprocessor assembly 12.

All subsystems of the disk drive system 10 over which the microprocessor can exercise direct control are coupled directly to the processor bus 20. Direct access to the critical nodes of those subsystems is through the digital signals conveyed to and from the processor bus 20.

Referring to FIG. 2, the microprocessor assembly 12 includes within memory 16 a Read Only Memory (ROM) 50 permanently preprogrammed with selected disk drive system functions and with an internal diagnostic program as hereinafter explained. In addition, a small variable data storage Random Access Memory (RAM) 52 is also provided for working storage.

The microprocessor module 14 comprises a Type 8080A microprocessing unit 84 (manufactured by Intel Corporation of Santa Clara, Calif.) with associated clock 56, system input and output control 58, timer 60, interrupt generating circuitry 62, microprocessing safety circuitry (CPU UNSAFE circuit) 64, input multiplexer 66 (for external manual control data input), switch status register 68, interrupt mask module 70, error status register 72, and output multiplexer 74. With the exception of clock 56, CPU UNSAFE circuitry 64, input multiplexer 66, switch status register 68, and output multiplexer 74, all circuit subsystems are coupled to the processor bus 20, the bus being coupled to an environment external of the microprocessor assembly 12. The microprocessor assembly 12 is thus a self-contained computing machine. As preprogrammed, the microprocessor assembly comprises a diagnostic controller.

Referring again to FIG. 1, the disk drive system servo electronics comprises a demodulator and phase locked oscillator (PLO) subassembly, hereinafter referred to as "Analog A" subsystem 32, a servo amplifier or "Analog B" subsystem 34, digital to analog (D/A) and analog to digital (A/D) converters or "Analog C" subsystem 36, a carriage driver 38, a voice coil type head position actuater 40, a carriage 42, and a servo position sensing head 44. The Analog A subsystem 32 is operative to receive servo data from for example servo head 44 and digital signals from processor bus 20 to generate a position signal and selected other control signals. The Analog B subsystem 34 provides drive signals to the carriage driver 38 in response to the position signal and selected other signals. The Analog C subsystem 36 is operative to control analog and digital portions of the servo electronics. All three servo electronic subsystems Analog A, Analog B and Analog C, 32, 34 and 36, are each coupled to the processor bus 20 through a digital input/output port.

The carriage driver 38 is operative to drive the head position actuater 40 which is mechanically coupled to the carriage 42. The servo position sensing head 44 is mounted to an arm of the carriage 42 and is operative to detect the location of the carriage 42 with respect to a disk stack 46 fixedly mounted on a spinning spindle 48. Other heads mounted to arms of carriage 42 are operative to magnetically record and detect digital information on the recording medium of the disk stack 46 which is conveyed to and from a read/write (R/W) circuit 80 and then to a read/write (R/W) data bus 49 in response to control signals from the interface I/O 26.

The host controller (not shown) is coupled only to the interface I/O 26 through the CUDI bus 24. (The CUDI bus 24 is interface used to connect an ISS 7350 'Disk Drive to either an ISS 7835 controller or an ISS 5046 controller.) The host controller has no direct access to the servo electronics. The microprocessor assembly 12 has no direct access to the R/W data bus 49, the R/W data bus 49 being coupled to the host central processing unit (not shown). However, the microprocessor assembly 12 does have access to and potential control over any subsystem coupled to the processor bus 20, including the subsystems Analog A, Analog B and Analog C, 32, 34 and 36 and the interface I/O 26. Subsystems directly coupled to the processor bus 20 can be analyzed and exercised under microprocessor control. Furthermore according to the invention, most of the critical circuit nodes of the servo electronic subsystems are accessible to the microprocessor assembly 12 through internal loopback features as implemented through a connection between the processor bus 20 and the A/D converter and D/A converter of the Analog C subsystem 36. A processor-controlled multiplexer system enables the microprocessor assembly 12 to segregate the signals originating in the servo electronics.

In order to describe the servo electronics subsystems, reference is made to FIGS. 3, 4 and 5. The circuit blocks are designated by names indicating their general nature and function, the construction of which will be apparent to those of ordinary skill in the art.

In FIG. 3, the interface I/O 26 is depicted in block diagram form. The interface I/O 26 comprises two input and output ports, Port A and Port B, which are coupled to a host controller (not shown) via CUDI bus 24. Each port A, B comprises drivers 100, 102 and receivers 104, 106 coupled, respectively, to a driver portion 108 and receiver portion 110 of the CUDI bus 24. The receiver portion 110 is coupled to command decoding logic 112, which in turn is operatively coupled to R/W circuit 80 (FIG. 1) and to a "Status 1" register 114. In addition, receiver portion 110 is coupled to a dual port Random Access Memory (RAM) 116, which in turn is coupled to the processor bus 20. Dual port RAM 116 is for buffering digital data between the CUDI bus 24 and the processor bus 20. The "Status 1" register 114 is also coupled to the CUDI bus 24 and to the processor bus 20, providing a temporary control signal storage for both processor bus 20 and I/O bus 24. The microprocessor module 14 (FIG. 1) is connected to one port of CUDI bus 24 through coupling 22. A Head Address Register (HAR) 118 is coupled from the driver portion 108 to the R/W circuit 80 (FIG. 1) for conveying head address information.

FIG. 4 depicts the elements of Analog C subsystem 36, which comprises an analog input multiplexer (MUX) 120 controlled by a multiplexer address register (MUX ADDR) 124 coupled to an A/D converter 122. The processor bus 20 is coupled into the output of A/D converter 122. In this manner all analog signals which are converted to digital form are accessible to the processor bus 20 and hence to the microprocessor assembly 12.

A D/A RAM 126 is coupled to a D/A converter 128, the output of which is coupled to an output multiplexer and sample and hold circuit 130. A refresh control circuit 132 is coupled to the D/A RAM 126 and to the output multiplexer circuit 130. The sample and hold circuit 130 provides as one output an automatic gain control (AGC) reference 131 and an A/D reference voltage, as represented by a signal line 134 which loops back to the A/D converter 122. The output multiplexer circuit also features a test loopback signal line 136 coupling to the input multiplexer 120. Using the test loopback signal line 136, the function of the A/D converter 122 and the D/A 128 as well as the input multiplexer 120 and output multiplexer 130 can be exercised and checked by supplying a digital input signal through the processor bus 20, converting it to analog, feeding it back through line 136, converting it to a digital signal, feeding it back into the processor bus 20 and comparing it to the original input signal.

In addition, the input multiplexer 120 is operative to receive ten analog input signals, namely AGC data, position, servo error, velocity, motor current, curve, curve D/A, +15 volt reference, −15 volt reference, and a ground reference. Many of these signals represent critical nodes important to the proper functioning of the disk drive system 10. The processor bus 20 provides microprocessor access to digital representations of these nodes. The analog input signals listed above are generated elsewhere within the servo electronics subsystems, as hereinafter explained.

Turning to FIG. 5, the elements of the Analog A subsystem 32 are depicted. These elements in general are operative to receive servo data about the actual position of the servo head 44 with respect to the disk stack, and to issue position and position correcting signals. Two principal functions are depicted in Analog A subsystem 32, namely, demodulator circuitry 140 and phase locked oscillator (PLO) circuitry 142. The demodulator circuitry 140 features a bank of "demod" registers 141. The demod registers 141 detect head placement by setting synchronized time windows to determine whether an input pulse signal (normally derived from servo position head 44) indicates that head placement is to the left or to the right of an intended servo track.

In order to eliminate actual head movement to generate a test input pulse signal, there is provided according to the invention a pseudo-position generator 144 which, in response to a digital signal received via processor bus 20 provides, as a pulse signal output simulated servo head position information. The pseudo-position generator 144 is a test oscillator operative to generate a phase controlled pulse train in response to a digital command signal. The test oscillator is capable of being set to simulate an "on track" condition or an offset condition of one-half track in either direction. The pseudo-position generator 144 is coupled to a termination 148 to which is also coupled the output of a preamp 146 to which is coupled the signal output of servo position head 44. Using the pseudo-position generator 144, all carriage control functions requiring servo data can be tested without actual carriage movement. For example, the output of the demod registers 141 can be tested by merely monitoring the resultant voltage signal indicating the position relative to the intended servo track and comparing the voltage signal with the value generated by the pseudo-position generator 144.

Referring now to the other elements of the Analog A subsystem 32, the phase locked oscillator element 142 is a synchronized oscillator in a phase locked loop which is operative to assure synchronism of the write function. The phase locked oscillator element 142 drives a write oscillator (not shown). A "PLO UNSAFE" signal is issued whenever an out of phase condition exists. In order to test the PLO element 142, FORCE PLO UNSAFE signal is issued through the processor bus 20 to determine whether signals correctly propagate through the PLO element 142.

Turning now to FIG. 6, there is depicted the Analog B subsystem 34, typically referred to as the servo amplifier. The servo amplifier controls the operation of the carriage driver 38. It operates in two feedback modes, namely the velocity feedback mode or coarse mode and the position feedback mode or fine mode. The servo amplifier is operative to receive and process signals from the processor bus 20 and from the Analog C subsystem 36. For example, a position signal derived from the demodulator block 140 (FIG. 5) is provided to a position signal input of the servo amplifier. Similarly a motor current reporting signal 35 (FIG. 1) is provided from the head position actuater 40 via the carriage driver 38.

The servo amplifier includes a tachometer 150 for converting position and motor current signals to a velocity feedback signal.

In a velocity signal feedback mode, the velocity feedback signal is switched via analog switch 151 to a servo error amplifier 154. In the velocity feedback mode, the feedback characteristic is nonlinear. A variable pilot signal is therefore generated, called a curve signal, the curve signal is derived from the position signal processed through a cylinder detector 153 and a target signal provided via processor bus 20 fed to a difference counter 157 which in turn generates a digital curve signal. The digital curve signal is converted to an analog signal by curve generator 156 and fed into the servo error amplifier 154 via analog switch 155. The servo error amplifier 154 compares the curve signal with the tachometer 150 output signal in order to generate the servo error signal which subsequently drives the carriage driver 38 (FIG. 1).

In the position feedback mode, the servo amplifier provides a position feedback signal coupled via a phase compensating network 158 and an analog switch 159 to the servo error amplifier 154. The head position actuater 40 in a position feedback mode operates in a linear or track following mode which does not require a curve signal. A status register 162 and control register 164 are provided to interface the Analog B subsystem 36 with the processor bus 20. A pulser control 160 is operative to convert the position signals and servo error signals to a form suitable to drive the carriage driver 38 (FIG. 1).

Having thus explained the principal circuit elements and subsystems of the disk drive, the autonomous diagnostic feature of the invention can now be understood. Because the disk drive system 10 includes an internally preprogrammed autonomous control device which has extensive access to both analog and digital nodes of the disk drive system 10, it is possible to exercise and diagnose subsystems to an extent not previously known and further to isolate faults to a relatively small functional block level. The sequence of internal testing is however important in order to isolate the internal faults with minimal ambiguity. For this reason, a general hierarchy of test functions is necessary, proceeding according to the dependency of function from the autonomous control system (the microprocessor assembly) through the interface I/O bus to the digital to analog and analog to digital converters, the decoders and the drive circuits.

A specific diagnostic hierarchy is hereafter set forth. In the specific example of the embodiment herein described, the hierarchy is substantially unique to the system architecture which has been described hereinabove. Appendix A included in the file history but not printed herewith, provides a complete listing of the self-diagnosis technique according to this specific example of the invention. The listing is provided in the assembly language of the microprocessing unit employed in the example above (8080 Assembly Language), and the listing includes internal documentation explaining the steps and identifying the circuit subsystems which are tested. The narrative hereinafter outlines the self-diagnosis technique. FIGS. 7A and 7B are cross-referenced to Appendix A.

Referring to FIG. 7A, power is applied to the disk drive system (200) and a general initialization sequence begins (201). The microprocessor assembly diagnostics begins with a test of the PROM 50 (202). This test is performed by summing the contents of all locations in each PROM with the last location. This sum should be zero, the PROM being designed so that the last location of the PROM represents the two's complement of the sum of all previous locations in the PROM. The second to last and third to last location in each PROM are checked to determine that they contain all one's and all zero's respectively, these locations having been preprogrammed to contain these values.

Next the microprocessor RAM 52 is tested (203). This test comprises writing test patterns into each memory location of the RAM 52, reading the locations back and verifying the contents. If either the PROM 50 or the RAM 52 tests fail, then either the PROM 50, the RAM 52 or the microprocessor module 14 is defective. Thereafter the registers associated with the processor bus 20 and microprocessor module 14 are checked (204). During this test, internal multiplexers 66, 74 are set up to loop the output ports back into input ports, test patterns are sent out to one output port and read back to check out the input ports. If the input ports successfully read back the test pattern, the input ports are presumed to be error free. Thereafter patterns are sent out through each output port and verified by reading in through one input port. If all patterns are verified, the output ports are presumed to be functioning correctly.

The interrupt functions of the microprocessor module are next checked (205). In this test the multiplexers 66, 74 and output ports previously tested are set up to feed into the interrupt control structure of the microprocessor assembly 12. An interrupt signal is sent to each of the interrupt lines in succession. Interrupt occurrence and memory address of the interrupt is verified. If no error occurs, the interrupt structure is presumed to be functional.

Next the microprocessor unit "UNSAFE" circuit 64 is tested. In this test, the protocol first checks to see that no interrupt is received from UNSAFE circuit 64 within a four millisecond interval after the circuit 64 is refreshed. Thereafter the protocol checks to see that an interrupt is received within the next four millisecond interval. Correct functioning of this circuit assures normal program flow. If an error occurs, the error signal will indicate whether failure occurred because of premature or late interrupt.

Next the timer 60 circuitry is checked (207). In this routine each timer is checked by loading each with a count for a specific "time out" value, then jumping to a software timing loop until interrupted by the timer 60. The "time out" value is then compared with the value in the software timing loop. An error is indicated if the two values fail to compare.

If none of the above diagnostic protocols indicate an error, then the microprocessor assembly 12 is presumed to be functioning as intended. The microprocessor assembly 12 is then used to test the other subsystems of the disk drive, beginning with the processor bus 20 test (208). In this test, data patterns are written into the dual port I/O RAM 116 of interface I/O 26 and to at least one other register in another subsystem, as for example the difference counter 157 in the Analog B subsystem 34. Then the data patterns are read back and compared. If the processor bus 20 is defective, then both registers will produce a nonverified pattern, if only one pattern register fails, then the processor bus 20 is assumed to be functioning correctly.

Next the interface I/O 26 is tested. First the modules are checked to see if they are installed in a physically correct manner (210). This involves sending out a test pattern to the "Status 1" register 114, reading it back and comparing the results.

The first interface test in sequence is of the dual port I/O RAM 116 (210). According to the protocol of this test, monotonically increasing values are written into each successive RAM 116 location after which the values are compared for verification. Because the RAM 116 is the principal conduit for data between the I/O bus 24 and the processor bus 20 the system must pass this test in order to pass any other test dealing with the interface I/O 26.

Thereafter, Port 1 of the interface I/O 26 is tested (211). According to this protocol a known bit pattern is written into RAM 116 location 0–6 and the complement of the test pattern is written into RAM 116 location 7. Thereafter the contents of RAM 116 location 7 is transferred to the Head Address Register 118 and thereafter the contents from the Head Address Register 118 is transferred to RAM 116 location 0. The value in RAM 116 location 0 is then compared with RAM 116 location 7.

Next the Head Address Register 118 reset capability is checked (212). This protocol verifies that the Head Address Register 118 can be reset by using the difference counter 157 clock enable signal. The Head Address Register 118 is first set to a non-zero value and then is cleared by momentarily disabling the difference counter clock signal. The value in the Head Address Register 118 is then written into RAM 116 location 0 where the value is verified to have been cleared to 0.

The "Status 1" register 114 is then tested (213). In this test, a test pattern is written into the "Status 1" register 114, read back and compared.

The Port 2 test can thereafter be performed (214). This test is identical to the Port 1 test (211) except that it is performed through Port 2 of the interface I/O 26.

If all of the I/O diagnostics have been successfully concluded, the protocol advances to the A/D and D/A diagnostics. This test sequence checks the Analog C subsystem. The D/A RAM 126 is first checked (215). Monotonically increasing values are written into each successive RAM 126 location which is thereafter compared for verification. Thereafter the A/D converter 122 is checked (216). According to this protocol, benchmarks of the output range are checked by providing first a +15 volt reference, then a −15 volt reference, and then a ground reference. Each reference is then converted to its digital value and compared for verification.

The D/A converter 128 is then checked (217). According to this protocol test values are written into the D/A RAM 126, fed through the output multiplexer 130 through the test loopback line 136 to the input multiplexer 120 then through the A/D converter 122, the output of which is compared to verify operation. All elements of the Analog C subsystem are in some way involved in this test.

After the Analog C subsystem diagnostics are successfully completed the Analog A diagnostics are performed. This test checks the pseudo-position generator or test oscillator 144, the automatic gain control (AGC) 145 signal and the differential position offset and position signal (218). The test oscillator circuitry is inherently checked in the course of the other diagnostics performed on the Analog A subsystem 32. First, the AGC reference is set to a fixed value and the pseudo-position generator 144 is set to the "on track" condition. The position signal is then verified to be within proper limits. Next the AGC circuitry 145 is tested by varying the AGC reference and verifying that the AGC data signal (as read through the A/D converter) responds correctly. Finally the position signal is checked by setting the pseudo-position generator 144 to the left and right "off track" conditions successively, reading the resulting position signal through the A/D converter 122 and checking for correct amplitude and correct polarity.

The servo amplifier or Analog B subsystem 34 can now be tested using the previously tested subsystems and elements. The first protocol is a check of the difference counter register 157 (219). According to this protocol, all possible combinations of the difference counter 157 are loaded and then verified. Thereafter high order difference bits are set and the status line indicating difference greater than 256 is checked. Finally the difference counter clock generated by the cylinder detectors 153 is checked to verify that the clock is indeed driving the counter properly.

The status register 162 is next tested (220). In this protocol the linear mode is set, verified then cleared and verified. Next test is performed on cylinder detector 153 (221). An "on track" signal is simulated and fine and coarse signals are checked to see if they are of the proper state. Next odd and even "off track" signals are simulated and fine and coarse signal states are checked to see if they are in the proper state.

The position signal and position channel are then checked (222). In this protocol the pseudo-position generator 144 is set to an "off track" condition and both signals are checked through the A/D converter 122 for correct amplitude. Then the pseudo-position generator 144 is set to the "on track" condition and both signals are checked to see that they are within one-half volt of ground reference.

Next the servo error amplifier 154 is checked (223). In this test an "on track" signal is simulated and the servo error test point provided through the A/D converter 122 to the processor bus 20 is tested to verify that the offset is within a preselected voltage limit, typically within one-half volt.

Next the curve generating circuits are tested (224). The difference counter 157 is set to selected values, then the output of the curve D/A 152 and curve generator 156 are checked to compare with the values loaded in the difference counter. Three points are checked, namely the upper limit, lower limit and center of the curve range.

Thereafter the PLO UNSAFE test is performed (225). According to this protocol the index timing and UNSAFE condition circuitry related to the phase locked oscillator 142 is checked. The UNSAFE check is performed by simulating an UNSAFE condition and testing to verify that an UNSAFE signal has been issued. Index timing is accomplished by measuring the time interval between index pulses and verifying that the interval is within a specified percentage of a limit.

Finally the carriage driver current can be tested (226). The driver current is checked by testing a driver current reporting circuit whose output from line 35 is input to the input multiplexer 120 (FIG. 6). According to this protocol the carriage driver 38 is activated with a known current value. The known current value is sampled through the processor bus 20 at the output of A/D converter 122. The current sample is then verified by comparison within limits of a known value. When each of the tests have been successfully completed, the disk drive system 10 can be safely activated.

Having thus explained the invention, other embodiments will be apparent to those of ordinary skill in the art. Accordingly it is not intended that the invention be limited except as indicated in the appended claims.

What is claimed is:

1. In a computer disk drive having a rotatable disk storage medium and means coupling said disk storage medium to a remote host controller, said host controller being operative for communicating digital data signals between a remote independently operative central processing unit of a master computer and said disk storage medium, said disk drive including a carriage for displacing a plurality of read and write heads, means for driving said carriage, and means for sensing the position of said carriage relative to said storage medium, a system internal to said disk drive for testing servo control and data communication subsystems of said disk drive comprising:
means for monitoring analog signals and digital signals representative of circuit operation generated by circuits within said servo control and data communication subsystems;
first converting means coupled to said monitoring means for converting all of said monitored analog signals to digital signals;
second converting means coupled to analog inputs of said subsystems for converting digital signals to analog signals;
means for communicating analog signals output from said second converting means to an input of said first converting means in a test loopback;
digital signal bus means coupled to said subsystems of said disk drive, said bus means also being coupled to an output of said first converting means and to an input of said second converting means, said bus means comprising a three-state bidirectional bus;
means including a programmed microprocessor and associated digital memory in said disk drive for controlling disk drive operation and diagnostic functions, said digital memory being for storage of preprogrammed instructions defining said operation and diagnostic functions, and said microprocessor being coupled to said bus means in order to communicate digital control signals to said subsystems including to said second converting means and to receive data and status signals from said subsystems including from said first converting means; and a pseudo-position generator for generating signals simulating position output signals of said carriage position sensing means with respect to said disk storage medium such that selected subsystems can be tested without carriage motion.

2. In a computer disk drive having a rotatable disk storage medium and means coupling said disk storage medium to a remote host controller, said host controller being operative for communicating digital data signals between a remote independently operative central processing unit of a master computer and said disk storage medium, a system internal to said disk drive for testing servo control and data communication subsystems of said disk drive comprising:

means for monitoring analog signals and digital signals representative of circuit operation generated by circuits within said servo control and data communication subsystems;

first converting means coupled to said monitoring means for converting all of said monitored analog signals to digital signals;

second converting means coupled to analog inputs of said subsystems for converting digital signals to analog signals;

means for communicating analog signals output from said second converting means to an input of said first converting means in a test loopback;

digital signal bus means coupled to said subsystems of said disk drive, said bus means also being coupled to an output of said first converting means and to an input of said second converting means, said bus means comprising a three-state bidirectional bus; and means including a programmed microprocessor and associated digital memory in said disk drive for controlling disk drive operation and diagnostic functions, said digital memory being for storage of preprogrammed instructions defining said operation and diagnostic functions, and said microprocessor being coupled to said bus means in order to communicate digital control signals to said subsystems including to said second converting means and to receive data and status signals from said subsystems including from said first converting means for stimulating isolated subsystem operation and response such that circuit and subsystem faults can be identified and isolated.

3. In a computer disk drive having a rotatable disk storage medium, a plurality of read and write heads, at least one position sensing head, a carriage and a carriage driving means for translating said heads relative to said disk storage medium, means coupling said disk drive to a remote host controller for communicating digital data signals between a remote independently operative central processing unit and said disk storage medium, subsystem means coupled to said position sensing head for sensing the position of said position sensing head, further subsystem means coupled to said position sensing subsystem means for generating a servo position error signal, further subsystem means coupled to said error signal generating subsystem means for generating a signal to drive said carriage driving means, means for monitoring analog signals and digital signals representative of circuit operation generated by circuits within said subsystem means, first converting means coupled to said monitoring means for converting all of said monitored analog signals to digital signals, second converting means coupled to analog inputs of said subsystems for converting digital signals to analog signals, means for communicating analog output signals from said second converting means to an input of said first converting means in a test loopback, digital signal bus means coupled to said subsystem means of said disk drive, said bus means also being coupled to an output of said first converting means and to an input of said second converting means, said bus means comprising a three-state bidirectional bus, and means including a programmed microprocessor and digital memory for controlling disk drive operation and diagnostic functions, said digital memory being for storage of preprogrammed instructions defining said operation and diagnostic functions, and said microprocessor being coupled to said bus means in order to communicate digital control signals to said subsystem means including to said second converting means and to receive data and status signals from said subsystem means including from said first converting means, a method of self-testing said disk drive comprising the steps of:

generating diagnostic signals at said programmed microprocessor intended for autonomously stimulating operation of individual ones of said subsystem means and communicating said diagnostic signals to said bus means;

communicating said diagnostic signals on said bus means to said subsystem means through said second converting means as analog signals to stimulate operation of individual ones of said subsystem means in isolation from other ones of said subsystem means;

causing said microprocessor to respond to said monitored signals representative of operation of an individual one of said subsystem means to analyze operation of said subsystem means; and generating an output signal indicative of the existence, location and nature of identified faults internal to said subsystem means.

4. The method as claimed in claim 3 wherein said self-test comprises causing said microprocessor to generate diagnostic signals to exercise said digital memory associated with said controlling means thereby to test said controlling means.

5. The method as claimed in claim 3 wherein said system further includes a pseudo-position generator, the method further comprising causing said pseudo-position generator to generate signals simulating output signals of said position sensing means in order to test selected subsystems without motion of said carriage.

6. The method as claimed in claim 5 which further comprises thereafter causing said microprocessor to generate diagnostic signals in a loop through said bus means to exercise input and output channels of said diagnostic controlling means.

7. The method as claimed in claim 6 which further comprises thereafter causing said microprocessor to generate diagnostic signals, to communicate said signals through said bus means to said second converting means, then through said loopback means to said first converting means, and from said first converting means through said bus means and thereafter to said microprocessor to obtain response signals for comparing with said generated signals in order to exercise and test said first converting means and said converting means.

8. The method as claimed in claim 5 which further comprises thereafter causing said microprocessor to apply an incrementing automatic gain control signal value to an input of said pseudo-position generator and verifying whether a resultant position signal is within acceptable limits in order to test said pseudo-position generator.

9. The method as claimed in claim 8 further comprising causing said pseudo-position generator to generate position signals simulating on-track signals and off-track signals and to generate selected timing signals in order to test at least said servo position error signal generating means and said carriage driving means.

10. The method as claimed in claim 9 further comprising causing said microprocessor to generate a signal representative of a known current value, using said signal to exercise said carriage driving means, and sampling the output current value of said carriage driving means through said bus means via the output of said first converter means and comparing said sampled current value to determine whether said sampled value is within limits of a predetermined value stored in said memory means.

* * * * *